July 4, 1933. J. F. MARTYN ET AL 1,917,138
STORAGE TANK FOR PETROL AND LIKE INFLAMMABLE LIQUIDS
Filed Dec. 15, 1930
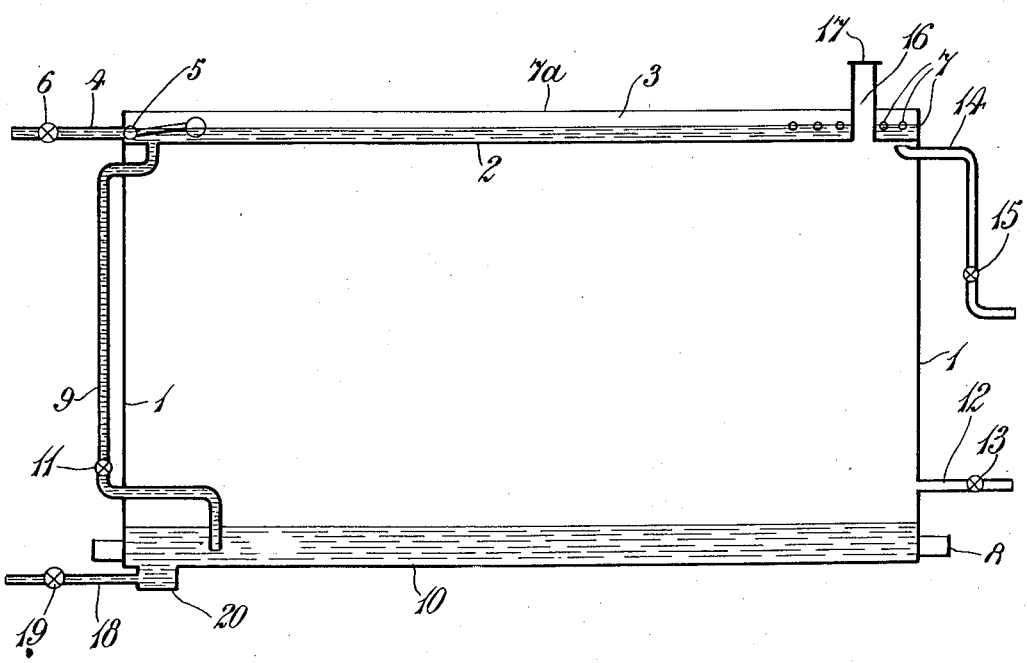
INVENTORS
J. F. Martyn.
R. J. Leggett.
By Lacey & Lacey
Attys Patented July 4, 1933

1,917,138

UNITED STATES PATENT OFFICE

JOHN FORREST MARTYN AND ROBERT JACKSON LEGGETT, OF DURBAN, UNION OF SOUTH AFRICA, ASSIGNORS TO GASOLENE STORAGE PATENTS (PROPRIETARY) LIMITED, OF DURBAN, SOUTH AFRICA

STORAGE TANK FOR PETROL AND LIKE INFLAMMABLE LIQUIDS

Application filed December 15, 1930, Serial No. 502,484, and in Great Britain September 1, 1930.

This invention relates to storage tanks for petrol and like inflammable liquids, and has for its principal object to provide an improved construction of tank whereby ullage, loss by vaporization, and danger of fire or explosion, may be reduced to a minimum and, in practice, entirely obviated.

In order to overcome the disadvantages inherent in the known storage tanks, wherein there is a considerable "dead" space, which ultimately becomes highly charged with vapour, above the surface of the liquid and below the roof, it has been proposed to float the petrol or inflammable liquid upon a heavier and inert liquid, such as water, which is supplied to the bottom of the tank at a suitable head to ensure that the petrol or inflammable liquid fills the tank right up to the roof, the petrol or inflammable liquid being withdrawn and supplied from the top of the tank. In another proposed arrangement, a floating roof is provided which floats on the inflammable liquid and is capable of rising and falling under the influence of temperature changes on the bulk of liquid in the tank. These proposed constructions are effective to practically eliminate ullage and losses by evaporation, but there is still the disadvantage that where the roof resting on the liquid is exposed to the sun on the outside it becomes very hot and there is a tendency for the liquid in contact with the underside of the roof to become decomposed. In this connection it is to be borne in mind that petrol, which is the liquid chiefly under consideration, is not normally a liquid of one density but usually is a mixture of spirits of varying densities, evaporating points and characteristics, and even under the action of gravity when standing in storage, there is a tendency for the heavier spirits to settle and for the lighter and more volatile spirits to rise. Losses due to surface evaporation are therefore of the richer spirits and the heating action of the hot roof is therefore an undesirable condition as it tends further to separate the volatiles.

In a more recent type of floating roof tank, the roof proper is carried upon floats so that there is an air space between the underside of the roof and the surface of the liquid. This arrangement, while providing an air space acting as an insulator between the liquid and the hot roof, again produces ullage with its consequent disadvantages. It is known, in connection with tanks having a "dead" or vapour space between the roof and the surface of the liquid, to spray the exterior of the roof and walls with water for the purpose of keeping the temperature down, but owing to the unavoidable evaporation in the "dead" space, it is not possible to maintain the tank at a constant temperature by such means, and means such as an aspirator valve, with resultant losses and sweating, has to be provided.

According to the present invention, a storage tank for petrol or other inflammable or volatile liquid is provided with a flat roof arranged or constructed to form a shallow, flat vessel above the roof for the reception of a cooling liquid, such as water, which is continuously supplied thereto so as to overflow down the exterior of the wall or walls of the tank. Advantageously, the water overflows down the walls through a number of small holes or serrations or the like in the upstanding wall or rim of the vessel, thereby ensuring substantially even distribution of a film of water over the whole of the exterior surface of the tank wall. Conveniently, the water is supplied to the vessel by means such as a ball valve adapted to maintain a substantially constant level, and the water advantageously is supplied at the centre of the vessel or at one or more positions so that a continuous circulation or flow of water is maintained in the vessel towards the wall thereof.

According to a further feature of the invention, a conduit or conduits is or are connected between the shallow vessel constituted by the roof and the lower part of the tank so that the petrol or like liquid is kept up against the underside of the roof by the head of water upon the roof. As this head is substantially constant, it provides a convenient means for discharging the petrol or the like through a valved outlet, pipe or the like communicating with the top of the tank just beneath the roof. The conduit or conduits referred to may be provided with a valve or valves to enable the conduit or conduits to be closed if desired.

The invention is hereinafter described by way of example with reference to the accompanying diagrammatic drawing which is a sectional view illustrating a storage tank in accordance with the present invention.

In carrying the invention into effect and with reference to the accompanying diagrammatic drawing, the tank 1, which may be of circular, square or other formation in plan, is provided with a flat roof 2 arranged somewhat below the upper edge 1a of the tank wall so as to provide a shallow vessel 3 above the roof for the reception of cooling liquid, such as water, which is continuously supplied to the vessel 3 through a supply pipe 4 under the control of an automatic ball valve 5 of any suitable construction, the supply pipe 4 advantageously having a control valve 6. At a suitable height above the flat roof 2 the upstanding portion of the tank wall is perforated with a number of holes 7 or is formed in its upper edge with V grooves or the like so that the cooling liquid may overflow from the vessel 3 down the exterior of the wall 1 in the form of a continuous film, a collecting gutter 8 being provided around the lower part of the tank by which the overflowing water is collected and carried away. By such means the roof 2 is at all times insulated by the layer of cooling liquid which is maintained thereon and thus cannot become overheated by the sun, while the wall of the tank is cooled by the continuous overflow from the vessel 3 through the perforations 7 or the like.

A conduit 9 leads from the bottom of the vessel 3 to a position a short distance above the bottom 10 of the tank, such conduit 9 being provided with a control valve 11. A suitable depth of water is always maintained in the bottom of the tank so that the petrol or like liquid stored therein is "floated" upon such layer of water, the petrol or like liquid being introduced, for example, by means of a pipe 12 provided with a valve 13. The petrol or like liquid is withdrawn as required through a pipe 14 opening into the tank at a position immediately below the roof 2, such pipe 14 having a control valve 15. With this arrangement, it will be understood that by opening the valve 11 the head of water in the vessel 3 will act to raise the petrol or like liquid introduced into the tank right up to the underside of the roof 2 so that there is no vapour space. During this operation any air or vapour trapped between the surface of the petrol or like liquid and the roof 2 is permitted to escape through a gauging hatch 16, the cover 17 of which is thereafter replaced. As the petrol or like liquid is thus under the constant head of the liquid in the vessel 3, the pressure on the top of the roof 2 is compensated by the corresponding pressure on the underside thereof, while, by opening the valve 15, the petrol or like liquid is delivered under a constant head through the pipe 14 as required. For the purpose of drawing off the water in the tank when it is required to refill the same with petrol or like liquid, a draw-off pipe 18 provided with a valve 19 and communicating with a sump 20 is provided. By closing the valve 11 and opening the valve 19, water in the tank is permitted to run out.

Any expansion of the stored petrol or like liquid will be relieved without any increase of pressure by the water being forced back through the conduit or conduits up to the roof top where it will escape by running down the sides. A minimum depth of water of about six inches is normally maintained in the bottom of the tank to allow for any expansion.

The cost of the water used in the plant will be negligible in comparison with the loss of petrol or the like due to evaporation which normally would occur.

Furthermore, it is obvious that in the construction of tank according to the present invention, the roof and walls may be very readily flooded to any desired degree in case of fire. As the petrol or like liquid issues under substantially constant pressure at a suitable height, it will not require any mechanical handling before being sent to the barrelling plant and the latter, working under constant head, will be much better controlled. In gauging the tank, it is only necessary to read the water level and subtract from the known height of the tank which is always full up to the underside of the roof.

What we claim is:—

In a storage tank for inflammable or volatile liquids, a flat roof forming a shallow vessel, a float valve controlled inlet for supplying cooling liquid to a pre-determined level in said vessel, there being perforations in the wall of the vessel maintaining a pre-determined head of cooling liquid in the vessel and permitting said liquid to overflow down the exterior of the tank wall, a valved conduit communicating with the bottom of the vessel and with the lower portion of the tank to supply the tank with liquid from the vessel so that the stored liquid in the tank is maintained against the underside of the roof by the head of liquid in the vessel above the roof, a valved outlet for the stored liquid in the tank communicating with the tank immediately below the roof, a valved inlet for said stored liquid communcating with the tank at a pre-determined level above the bottom thereof, a valved outlet communicating with the bottom of the tank, and a gauging hatch communicating with the tank underneath the bottom of the vessel for permitting the escape of entrapped air between the roof and the surface of the stored liquid within the tank.

J. F. MARTYN.
R. JACKSON LEGGETT.